United States Patent [19]

Pittman

[11] 4,408,728

[45] Oct. 11, 1983

[54] ANTI-REVERSE ACTUATOR MECHANISM

[75] Inventor: John B. Pittman, Tulsa, Okla.

[73] Assignee: Brunswick Corporation, Skokie, Ill.

[21] Appl. No.: 333,119

[22] Filed: Dec. 21, 1981

[51] Int. Cl.³ .............................................. A01K 89/01
[52] U.S. Cl. ........................ 242/84.2 A; 242/84.5 A; 74/576; 188/823
[58] Field of Search .................. 242/84.2 A, 84.21 A, 242/84.5 A, 84.51 A, 84.1 R, 84.2 R, 84.21 R; 74/576; 188/82.3, 82.34, 82.4

[56] References Cited

U.S. PATENT DOCUMENTS

| 3,225,874 | 12/1965 | Woolley | 74/576 |
| 3,481,554 | 12/1969 | Hull | 242/84.2 A |
| 3,489,365 | 1/1970 | Hull | 242/84.2 A |
| 4,323,203 | 4/1982 | Neufeld | 242/84.5 A |

FOREIGN PATENT DOCUMENTS 20845 2/1961 German Democratic Rep. ................................ 242/84.5 A Primary Examiner—Billy S. Taylor
Attorney, Agent, or Firm—John G. Heimovics

[57] ABSTRACT

An anti-reverse actuator mechanism having an actuator defined by a coil spring (20) associated with the center shaft (15) of the reel and which has an end coil (90) extending therefrom to engage a part (92) of an anti-reverse pawl (70). The coil spring is mounted on structure associated with the center shaft including a pair of spacers (89,81) whereby, through frictional engagement, the coil spring is caused to rotate with the center shaft and rotation thereof causes positioning of the anti-reverse pawl. When the anti-reverse pawl reaches its operative position and its limit of travel, the coil spring slips relative to the center shaft.

10 Claims, 5 Drawing Figures

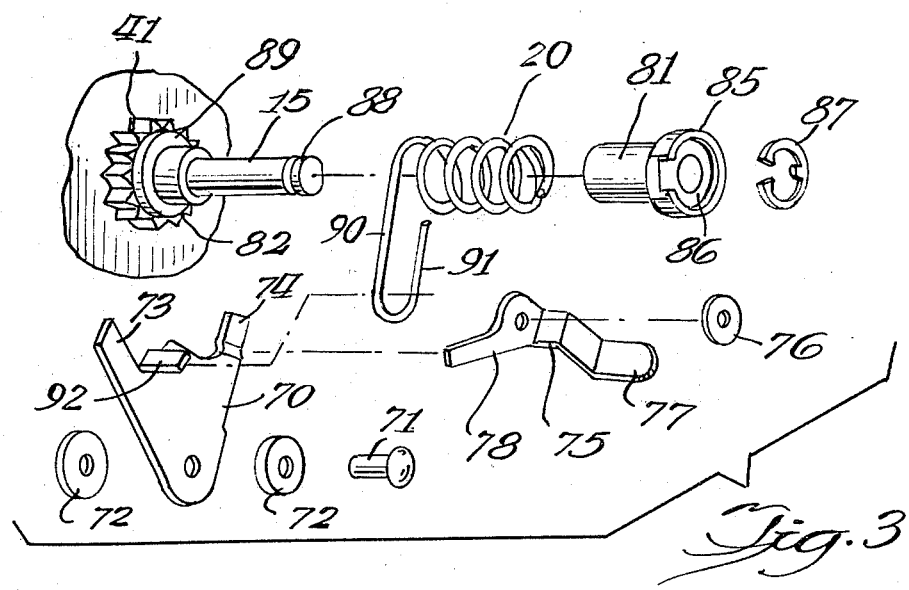
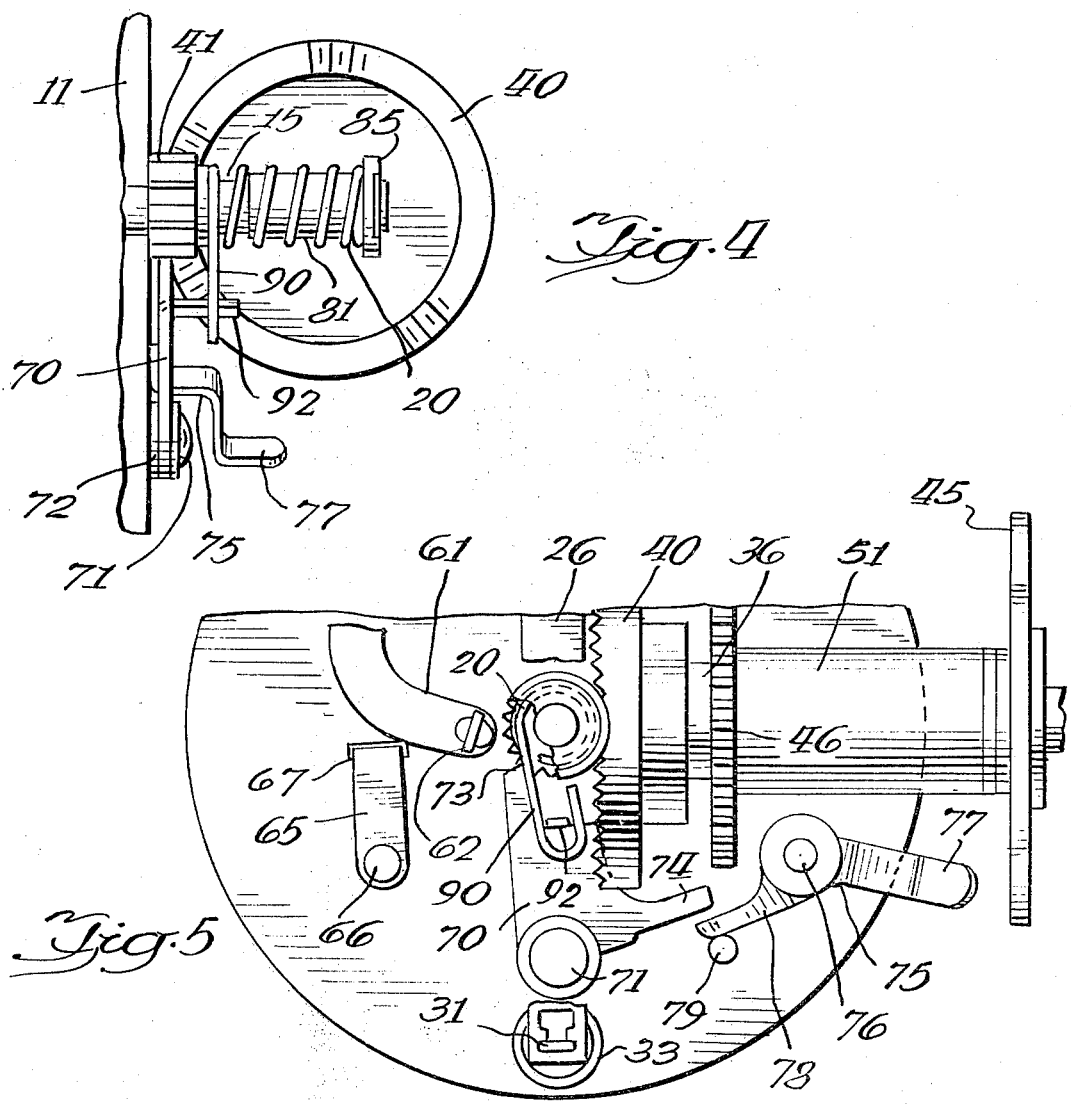

ANTI-REVERSE ACTUATOR MECHANISM

TECHNICAL FIELD

This invention relates to a spin cast style fishing reel and, more particularly, to an anti-reverse actuator mechanism.

BACKGROUND ART

Exemplary of anti-reverse actuator mechanism is the structure shown in Hull U.S. Pat. No. 3,489,365 wherein an anti-reverse pawl is associated with an actuator mounted on a center shaft for the reel. The actuator is mounted on the center shaft by means of clutch washers, a tension-creating spring, and a member for holding the components associated with the crankshaft, such as a C-clip. This structure requires a large number of structural elements involving substantial assembly time.

DISCLOSURE OF THE INVENTION

The present invention proposes the use of the prior art tension-creating spring as an anti-reverse actuator. The tension-creating spring is a coil-spring surrounding a shaft of the reel and yieldably rotatable therewith. The coil spring has a part thereof shaped to extend into engagement with the pawl of the anti-reverse device whereby rotation of the coil spring as caused by the shaft on which the spring is mounted causes corresponding movement of the pawl. The spring can slip relative to the shaft when the pawl reaches the end of its travel. This anti-reverse actuator construction reduces the number of parts required with a corresponding reduction in assembly time.

The present invention further proposes having an end coil of the coil spring defining the actuator extend away from the body of the coil spring with a part thereof directly engageable with the pawl of the anti-reverse device whereby movement of the coil spring can be transmitted directly to the pawl without any intervening parts.

More particularly, the coil spring is associated with the center shaft of the reel and mounted between spacers retained in position on the center shaft whereby the coil spring can perform its conventional function of urging the center shaft linearly to a limit position while, additionally, being yieldably rotatable with the center shaft for imparting movement to the anti-reverse pawl while being free to slip relative to the center shaft when the pawl has reached the end of its travel.

BRIEF DESCRIPTION OF THE DRAWINGS

FIG. 3 is a fragmentary exploded perspective view of the actuator mechanism, the center shaft, and the anti-reverse device;

FIG. 4 is a side elevational view showing the parts of FIG. 3 in assembled relation; and FIG. 5 is a fragmentary view, similar to FIG. 2, showing the anti-reverse pawl in operative position.

DESCRIPTION OF THE BASIC STRUCTURE AND OPERATION OF FISHING REEL

Figure 1:
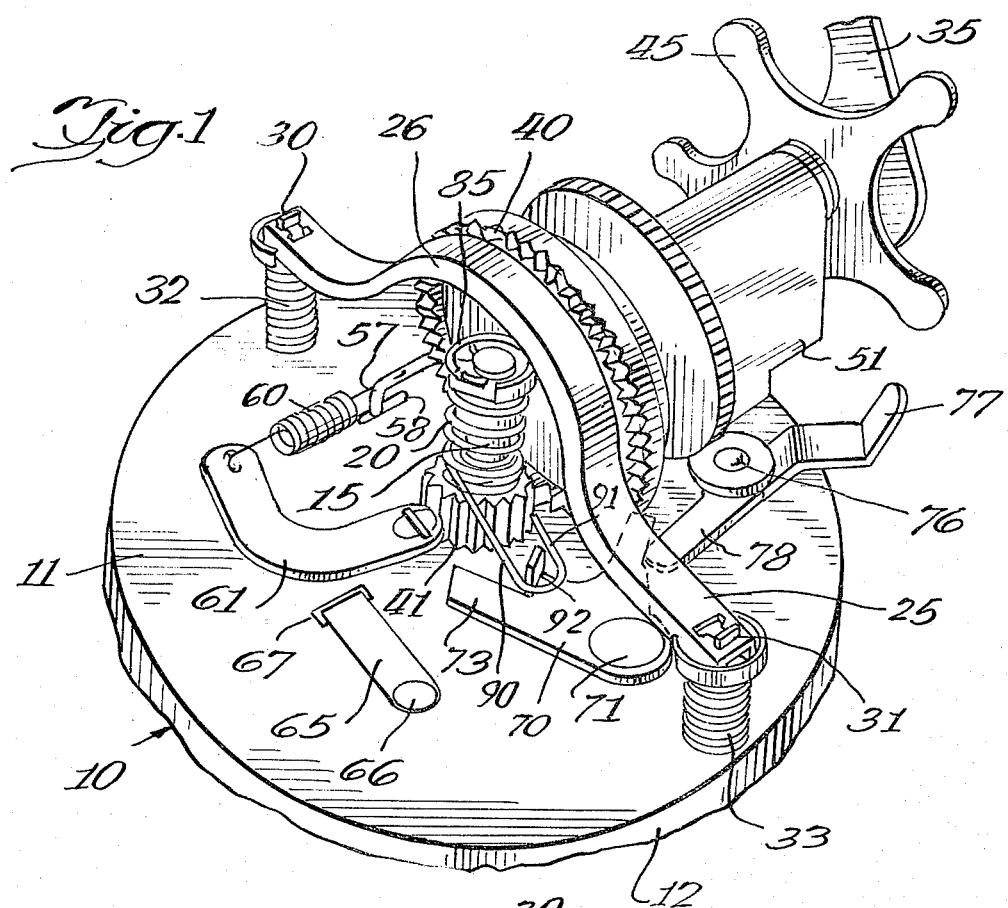
FIG. 1 is a fragmentary perspective view looking toward the rear of a spin casting style fishing reel with the rear cover removed.
Figure 2:
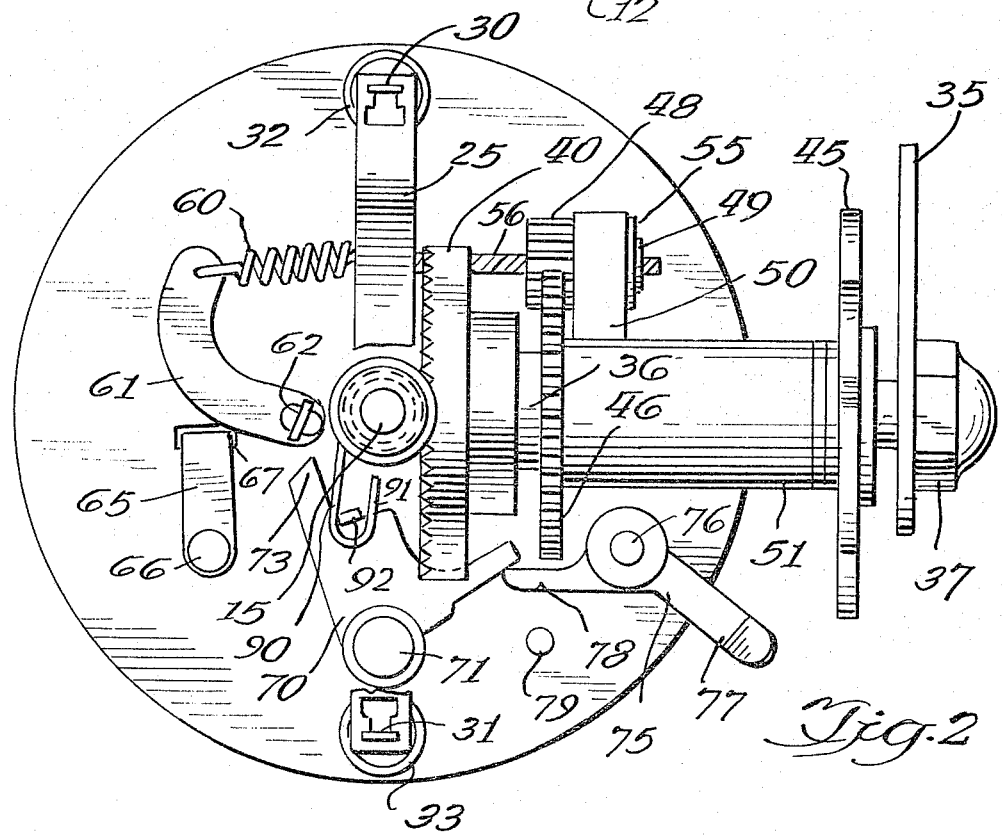
FIG. 2 is a rear elevational view of the reel with the rear cover removed and with parts broken away.

Basic components of the fishing reel, indicated generally at 10, including those pertinent to the invention, are shown in FIGS. 1 and 2. The reel has a body assembly 11, formed as a generally cylindrical member, with peripheral flanges suitably shaped for mounting front and rear covers (not shown). The pertinent structure is located rearwardly of the body assembly 11 and FIGS. 1 and 2 show such structure with the cover removed.

A center shaft 15, shown more particularly in FIGS. 3 and 4, extends through the body assembly 11 and is rotatably mounted therein as well as being mounted for linear lengthwise movement longitudinally of the reel. A coil spring 20 surrounding the center shaft is a tension-creating spring and operates to urge the center shaft toward a linear limit position rearwardly of the body assembly. In this position, the center shaft operates to set a brake ring for the line spool as well known in the art. The control shaft 15 can be advanced forwardly from its rear limit position by a brake bar 25 having an arcuate part 26 which can be moved toward the body assembly by a thumb button, not shown, to engage an end of the center shaft and linearly advance the center shaft forwardly of the reel. Opposite ends of the brake bar are interlocked with ends 30 and 31 of legs extending from a brake ring retainer (not shown). A pair of compression springs 32 and 33 urge the brake bar 25 rearwardly of the reel.

The foregoing structure of the reel is generally as shown in Hull U.S. Pat. No. 3,836,092 and the disclosure thereof is incorporated herein by reference.

A manually-operable crank 35 is secured to a crankshaft 36 by a nut 37 at the end of the crankshaft for causing rotation of the crankshaft. A drive gear 40 on the crankshaft meshes with a pinion gear 41 fixed to the center shaft 15 for rotation therewith, as by a key which permits longitudinal movement of the center shaft relative to the pinion gear. A star wheel 45 is secured to a hollow shaft (not shown) which surrounds the crankshaft 36 and a spur gear 46 is connected to the hollow shaft whereby rotation of the star wheel rotates the spur gear. The spur gear 46 meshes with a spur gear 48 having a hollow shaft 49 integral therewith and which is rotatably mounted within an integral extension 50 of the body assembly 11. A boss 51, extending from the body assembly 11, rotatably mounts the hollow shaft supporting the star wheel 45 and the spur gear 46 with the crankshaft 36 being rotatably mounted within the hollow shaft.

The hollow shaft 49 is held in association with the integral body extension 50 by a clip 55 and the hollow shaft is internally threaded for coaction with a jack screw 56 extending therethrough and having a portion thereof threaded to threadably engage the hollow shaft 49. The jack screw has a turned end 57 movable within a slot 58 in the body assembly 11 for limiting movement of the jack screw. A relatively tight spring 60 is connected at one end to the turned end 57 of the jack screw and, at its other end, to a lever 61. The lever 61, at its other end, is connected to an end 62 of a cam shaft which is rotatably mounted within and extends through the body assembly 11.

The operation of the jack screw 56 controls the "drag" or the resistance to slippage of the line spool (not shown) of the reel by controlled rotation of the cam shaft. The structure and operation of the crankshaft 36 and drag structure including the cam shaft are more particularly shown and described in Hull U.S. Pat. No. 3,778,001. The disclosure of this patent is incorporated by reference and reference may be made thereto for a more detailed understanding of the foregoing structure.

A clicker spring 65 is fastened to the body assembly 11 at 66 and has an inturned end extending through an opening 67 of the body assembly to engage serrations on the line spool and provide an audible signal of spool rotation.

An anti-reverse device includes a pawl 70 pivotally mounted on the body assembly 11 by suitable means, such as a rivet 71 and positioned by a pair of spacers 72 at opposite sides of the pawl. The pawl has an extension with an end 73 which is movable into engagement with a tooth on the pinion gear 41, as shown in FIG. 5, to prevent rotation of the center shaft in a counterclockwise direction, as viewed in the Figure. A pawl arm 74 extends to a position for selective engagement by an anti-reverse control lever 75 which is pivotally-mounted on the body assembly at 76. An arm 77 of the lever extends outwardly of the reel for manual engagement and an arm 78 is positionable either in an inoperative position, shown in FIG. 5, to permit control of the anti-reverse device dependent upon rotation of the center shaft, or to lock the anti-reverse device out of operation, which is the position shown in FIG. 2. A stop 79 limits rotation of the control lever 75 in one direction. A structure of this general type is shown in the Hull U.S. Pat. No. 3,778,001, which has previously been incorporated by reference.

DESCRIPTION OF THE PREFERRED EMBODIMENT

The preferred form of anti-reverse actuator mechanism embodies a modification of the coil spring 20 and its mounting whereby the coil spring directly coacts with the anti-reverse pawl and is yieldably rotatable with the center shaft 15. The coil spring, when rotated with the center shaft, can impart pivoting movement to the anti-reverse pawl 70 until the pawl reaches the end of its travel and the coil spring then slips relative to continued rotation of the center shaft 15.

More particularly, a pair of T-shaped spacers 89 and 81 are rotatably-mounted on the center shaft, with the spacer 89 being a bottom spacer having a flange 82 which rotatably abuts the pinion gear 41. The coil spring 20 has the body thereof mounted on the cylindrical bodies of the spacers with one end of the coil spring abutting the flange 82 of the bottom spacer and the other end abutting a flange 85 of the spacer 81 which is the top spacer. The top spacer 81 has a C-shaped bore 86, formed within the flange 85, to capture a C-shaped retaining ring or clip 87 which removably fastens into a groove 88 formed adjacent the end of the center shaft. With the parts assembled as shown in FIGS. 1, 2, 4 and 5, the coil spring 20 is a tension-creating spring operable to extend the center shaft 15 to its rearmost position, as shown in FIG. 4, while permitting linear advance of the center shaft 15 forwardly of the reel and toward the left, as viewed in FIG. 4, when the brake bar 25 is actuated by the thumb button of the reel.

The friction of the spacers 89 and 81 against the pinion gear and clip 87, respectively, which are fixed to the center shaft as created by the end pressure of the spring causes the spring to rotate with the center shaft.

A part of the spring and, more particularly, an end coil 90 extends away from the body of the spring and, therefore, from the center shaft. The end coil has a loop at an end thereof formed by a reversely-turned end 91 of the spring which loosely captures a tab 92 extending outwardly from the plane of the anti-reverse pawl 70. With the anti-reverse pawl 70 positioned as shown in FIG. 2 and with the control lever pivoted counterclockwise from the position shown to have the arm 78 against the stop 79, the pawl is free for movement. When the center shaft 15 rotates in a counterclockwise direction, as viewed in FIG. 2, the coil spring 20 rotates with the center shaft and the loop in the end coil moves from left to right to engage the tab 92 and cause following movement of the anti-reverse pawl 70 to the locking position shown in FIG. 5.

The retaining ring 87 and the bottom spacer 89 define bearing surfaces which, through pressure of the coil spring 20, normally cause the coil spring to move with the center shaft but, when the pawl 70 has reached an end of its travel, such as the position shown in FIG. 5, permit the coil spring to slip while the center shaft 15 continues to rotate. If the control lever 75 is pivoted from the position of FIG. 5 to the operative position of FIG. 2, it is evident that the pawl 70 will be pivoted in a counterclockwise direction and with this movement being permitted by slipping of the coil spring relative to the center shaft 15.

I claim:

1. In a spin cast-type reel having a center shaft (15) mounted for both rotation and lengthwise movement longitudinally of the reel, means for advancing and retracting the center shaft (15) lengthwise of the reel, means for rotating the center shaft (15), a coil spring (20) associated with said center shaft, and a selectively operable anti-reverse device (70) operable in response to rotation of said center shaft, the improvement wherein said coil spring is the actuator for the anti-reverse device and is yieldably rotatable with said center shaft, and a part (90) of said spring extends away from said center shaft and into engagement with said anti-reverse device, said coil spring compressing lengthwise to yieldably resist longitudinal movement of the center shaft.

2. The spin cast-type reel of claim 1 wherein said anti-reverse device includes a pivoted pawl (70) and said spring part is an end coil of the spring (20) engaging a part (92) of the pawl.

3. The spin cast-type reel of claim 1 wherein said coil spring (20) surrounds said center shaft (15) and a pair of spacers (89,81) one at each end of the coil spring coact with parts (41,87) rotatably fixed to the center shaft to permit said yieldable rotation of the coil spring.

4. The spin cast-type reel of claim 1 wherein said center shaft (15) has a pinion gear (41) spaced from an end thereof, a bottom spacer (89) on said center shaft abutting said pinion gear, said coil spring (20) surrounding said center shaft and having one end engageable with said bottom spacer, a top spacer (81) on said center shaft engageable with the other end of the coil spring and positioned adjacent an end of the center shaft, and a retaining ring (87) mounted on said shaft for engagement with the top spacer.

5. The spin cast-type reel of claim 4 wherein said top and bottom spacers (89,81) are T-shaped with a cylindrical body positioned within the coil spring.

6. The spin cast-type reel of claim 1 wherein said anti-reverse device includes a pivoted member (70) with a tab (92) projecting therefrom and said spring part is a length (90) of the spring extending away from said center shaft and having a loop engageable with said tab.

7. In a spin-cast reel having a center shaft (15), means for rotating the center shaft (15) to cause take-up of line within the reel, means for advancing the center shaft (15) lengthwise of the reel, a coil spring (20) surrounding said shaft for yieldably urging said center shaft to a rearward position in the reel, and an anti-reverse pawl (70) selectively positionable to prevent rotation in one direction of said center shaft as controlled by rotation of the center shaft, the improvement wherein said coil spring (20) is yieldably rotatable with the center shaft (15) and has an end coil (90) extended away from the center shaft; and said pawl and end coil having a motion-transmitting connection (91,92) therebetween.

8. The spin cast-type reel of claim 7 wherein said motion-transmitting connection is a loop formed on said end coil and a tab (92) extending from said pawl.

9. The spin cast-type reel of claim 9 wherein members (89,81) having bearing surfaces (82,85) are positioned at opposite ends of the coil spring.

10. In a spin cast-type reel having a center shaft (15), means for rotating the center shaft (15) to cause take-up of line within the reel, means for advancing the center shaft (15) lengthwise of the reel, a pinion gear (41) rotatably fixed to the center shaft, a coil spring (20) associated with said center shaft for yieldably resisting longitudinal movement of the center shaft, and a selectively operable anti-reverse pawl (70) operable in response to rotation of said center shaft, the improvement wherein a pair of T-shaped spacers (89,81) are mounted on said center shaft (15) and positioned one at each end of the coil spring to define top and bottom spacers, the bottom spacer engaging the pinion gear; means (41,87) on said center shaft to limit the maximum distance between said spacers including a C-shaped retaining ring (87) fastened to the center shaft adjacent an end thereof; said top spacer (81) having a C-shaped bore (86) to capture the retaining ring (87); said coil spring (20) having a coil (90) thereof engageable with the anti-reverse pawl (70) to position the pawl in response to rotation of the coil spring (20) with the center shaft (15); and the coil spring (20) and top and bottom spacers (89,81) slipping relative to the pinion gear and retaining ring when the pawl reaches the end of its travel.

* * * * *